(12) United States Patent
Swan

(10) Patent No.: US 6,690,427 B2
(45) Date of Patent: Feb. 10, 2004

(54) METHOD AND SYSTEM FOR DE-INTERLACING/RE-INTERLACING VIDEO ON A DISPLAY DEVICE ON A COMPUTER SYSTEM DURING OPERATION THEREOF

(75) Inventor: Philip L. Swan, Richmond Hill (CA)

(73) Assignee: ATI International SRL, Christ Church (BB)

( * ) Notice: Subject to any disclaimer, the term of this patent is extended or adjusted under 35 U.S.C. 154(b) by 408 days.

(21) Appl. No.: 09/772,035

(22) Filed: Jan. 29, 2001

(65) Prior Publication Data
US 2002/0101535 A1 Aug. 1, 2002

(51) Int. Cl.[7] .................................. H04N 7/01
(52) U.S. Cl. .................... 348/448; 348/441; 348/446
(58) Field of Search ............................ 348/441, 446, 348/448, 452, 458, 459; 345/603; 382/298, 276; H04N 7/01, 11/20

(56) References Cited

U.S. PATENT DOCUMENTS

| | | | | |
|---|---|---|---|---|
| 5,517,247 | A | * 5/1996 | Correa et al. | ............... 348/448 |
| 6,370,198 | B1 | * 4/2002 | Washino | ................ 375/240.26 |
| 6,392,706 | B1 | * 5/2002 | Sugiyama | ................... 348/458 |
| 6,437,828 | B1 | * 8/2002 | Chambers et al. | ........... 348/458 |
| 6,549,240 | B1 | * 4/2003 | Reitmeier | .................... 348/459 |
| 2002/0075412 | A1 | * 6/2002 | Tang et al. | .................. 348/441 |

FOREIGN PATENT DOCUMENTS

JP           10-322626       * 12/1998

* cited by examiner

Primary Examiner—Sherrie Hsia
(74) Attorney, Agent, or Firm—Vedder, Price, Kaufman & Kammholz, P.C.

(57) ABSTRACT

The television system for displaying images on a television display has a source of a series of video fields. An active de-interlacer receives first field data from a first field of the series of video fields and second field data from a second field of the series of video fields, and produces de-interlaced data and control data. A format converter has a vertical scaler then directly receives the de-interlaced data and produces vertically scaled data therefrom. The format converter also has a re-interlacer that receives the vertically scaled data and the control data, and produces a re-interlaced frame. A horizontal scaler is connected to receive the re-interlaced frame and to produce therefrom a horizontally scaled re-interlaced frame. Display drivers receive the horizontally scaled re-interlaced fame and produce therefrom television display signals for forming images on a television, a high definition television of other type of television display.

22 Claims, 4 Drawing Sheets

METHOD AND SYSTEM FOR DE-INTERLACING/RE-INTERLACING VIDEO ON A DISPLAY DEVICE ON A COMPUTER SYSTEM DURING OPERATION THEREOF

FIELD OF THE INVENTION

The invention relates generally to methods and devices for de-interlacing ands re-interlacing video for display on a progressive display and more particularly to methods and apparatus for de-interlacing and re-interlacing video using information indicative of motion in images of a video signal.

BACKGROUND OF THE INVENTION

Progressive display devices display all lines of an image every refresh. In contrast, interlaced display devices, such as NTSC and PAL television displays, typically display images using even and odd line interlacing. To display interlaced video on a progressive display, video rendering systems have to generate pixel data for scan lines that are not received in time for the next frame update. This process is called de-interlacing. For applications such as High Definition Television (HDTV), it is often necessary to display video in a different resolution or in a window on another video image.

A problem in processing video images exists particularly for personal computers having multimedia capabilities since interlaced video information received from conventional video tapes, cable television broadcasters (CATV), digital video disks (DVD's) and direct broadcast satellite (DBS) systems must be de-interlaced for suitable display on a progressive (non-interlaced based) display device, and scaled and re-interlaced by a television encoder for display on an interlaced display device.

A current video compression standard, known as MPEG-2 specifies the compression format and decoding format for interlaced and non-interlaced video picture information. MPEG-2 video streams have picture data divided as blocks of data. These blocks of data are referred to as macroblocks in the MPEG-2 standard. Generally, a macroblock of data is a collection of Y, Cr, Cb (color space) blocks which have common motion parameters. Therefore, a macroblock of data contains a section of the luminance component and spatially corresponding chrominance components. A macroblock of data can either refer to source, decoded data or to the corresponding coded data elements. Typically, a macroblock of data (macroblocks) consists of blocks of 16 pixels by 16 pixels of Y data and 8 by 8, or 16 by 16 pixels of Cr and Cb data in one field or frame of picture data.

Generally, in MPEG-2 systems, two fields of a frame may be coded separately to form two field pictures. Alternatively, the two fields can be coded together as a frame. This is known generally as a frame picture. Both frame pictures and field pictures may be used in a single video sequence. A picture consists of a luminance matrix Y, and two chrominance matrices (Cb and Cr).

MPEG-2 video streams also include data known motion vector data that is solely used by a decoder to efficiently decompress the encoded macroblock of data. A motion vector, referred to herein as a decoding motion vector, is a two-dimensional vector used for motion compensation that provides an offset from a coordinate position in a current picture to the coordinates in a reference picture. The decoder uses the decoding motion vector data stream to reference pixel data from frames already decoded so that more compact difference data can be sent instead of absolute data for those referenced pixels or macroblocks. In other words, the motion vector data is used to decompress the picture data in the video stream. Also, zero decoding motion vectors may indicate that there was no change is pixel data from a previously decoded picture.

In MPEG-2 video streams, decoding motion vectors are typically assigned to a high percentage of macroblocks. Macroblocks can be in either field pictures or frame pictures. When in a field picture it is field predicted. When in a frame picture, it can be field predicted and frame predicted.

A macroblock of data defined in the MPEG-2 standard includes among other things, macroblock mode data, decoding motion vector data and coded block pattern data. Macroblock mode data are bits that are analyzed for de-interlacing purposes. For example, macroblock mode data can include bits indicating whether the data is intracoded. Coded block pattern data are bits indicating which blocks are coded.

Intracoded macroblocks are blocks of data that are not temporarily predicted from a previously reconstructed picture. Non-intracoded macroblocks have a decoding motion vector(s) and are temporarily predicted from a previously reconstructed picture.

Several basic ways of de-interlacing interlaced video information include a "weave" method and a "bob" method. With the "weave", or merge method, successive even and odd fields are merged. Each frame to be displayed is constructed by interleaving the scan lines of a pair of fields. This "weave" method is generally most effective with areas of a picture that do not have motion over successive frames because it provides more pixel data detail for non-moving objects. However, when motion does occur, artifacts appear in the form of double images of a moving object. An artifact called "Comb Tearing" or "Feathering" appears around the periphery of a horizontally moving object causing poor image quality. Images with vertically motion also have artifacts.

In contrast to the "weave" method, the "bob" method displays single fields as frames. The missing scan lines are interpolated from available lines in the filed making the frame rate the same as the original field rate. The most often used methods are line repetition, line averaging and edge-adaptive spatial interpolation. Again, this de-interlacing method is also not typically used with some form of motion detection so that non-moving images can appear to be blurry from loss of image detail. This can result from inaccurate interpolation of pixel data. The "bob" technique introduces flicker that is noticeable in video sequences with no motion. This occurs because even when the scene is static, two different frames are created—one based on the even field and one based on the odd field. These frames are generally different. Where they are different, flicker occurs as the display alternates between the two frames.

There are a number of techniques categorized as motion adaptive de-interlacing. These use different de-interlacing strategies in picture areas with and without motion. Generally, "bob" is used in picture areas with motion and "weave" is used in picture areas without motion. Often, separate de-interlacers and/or separate motion detection hardware is used to carryout the above methods, as well as separate hardware for scaling and re-interlacing video (TV encoder). However, separate de-interlacers, motion detection, scaling and re-interlacing hardware can add additional cost to a graphics processor.

Graphics processors are known to include 2D/3D engines that fetch data from a frame buffer and blend pixels together to render an image and place the blended data back in the frame buffer. The frame buffer is memory accessible by the graphics processor. Such graphics processors are also known to include display engines which obtain rendered images from the frame buffer and may subsequently perform simple deinterlacing operations (such as "bob" and "weave"), but do not typically rewrite the deinterlaced information back to the frame buffer. As known in the art, the specifics of operations supported by 2D/3D engines vary. Also, it is not uncommon among 2D/3D engines for the same operation to use a different number of passes on different chips. Lighting and multi-texture affects are examples of features where different implementations partition the signal processing steps differently to achieve a tradeoff between die area, complexity, memory bandwidth, and performance. The feature sets of 2D/3D engines evolve rapidly to make them more and more efficient at the tasks for which they are most frequently programmed.

The order in which display pixels are obtained is typically controlled by the display device which influences the way in which pixels are fetched. For a display engine to perform advanced deinterlacing that requires the inspection of more source pixels, additional data needs to be fetched above and beyond the data needed for a simple "bob" or "weave" deinterlacing and display. As memory bandwidth is precious to a high performance graphics chip, additional on-chip memories are often used to reduce the amount of refetching required, thereby increasing the cost of the device instead.

Accordingly, there is a need for an improved graphics processor that performs de-interlacing, as well as re-interlacing and scaling for television encoding.

BRIEF DESCRIPTION OF THE DRAWINGS

The features of the present invention which are believed to be novel are set forth with particularity in the appended claims. The invention, together with further objects and advantages, must be understood by reference to the following description taken in conjunction with the accompanying drawings in the several figures of which like reference numerals identify like elements.

DETAILED DESCRIPTION OF A PREFERRED EMBODIMENT OF THE INVENTION

Figure 1:
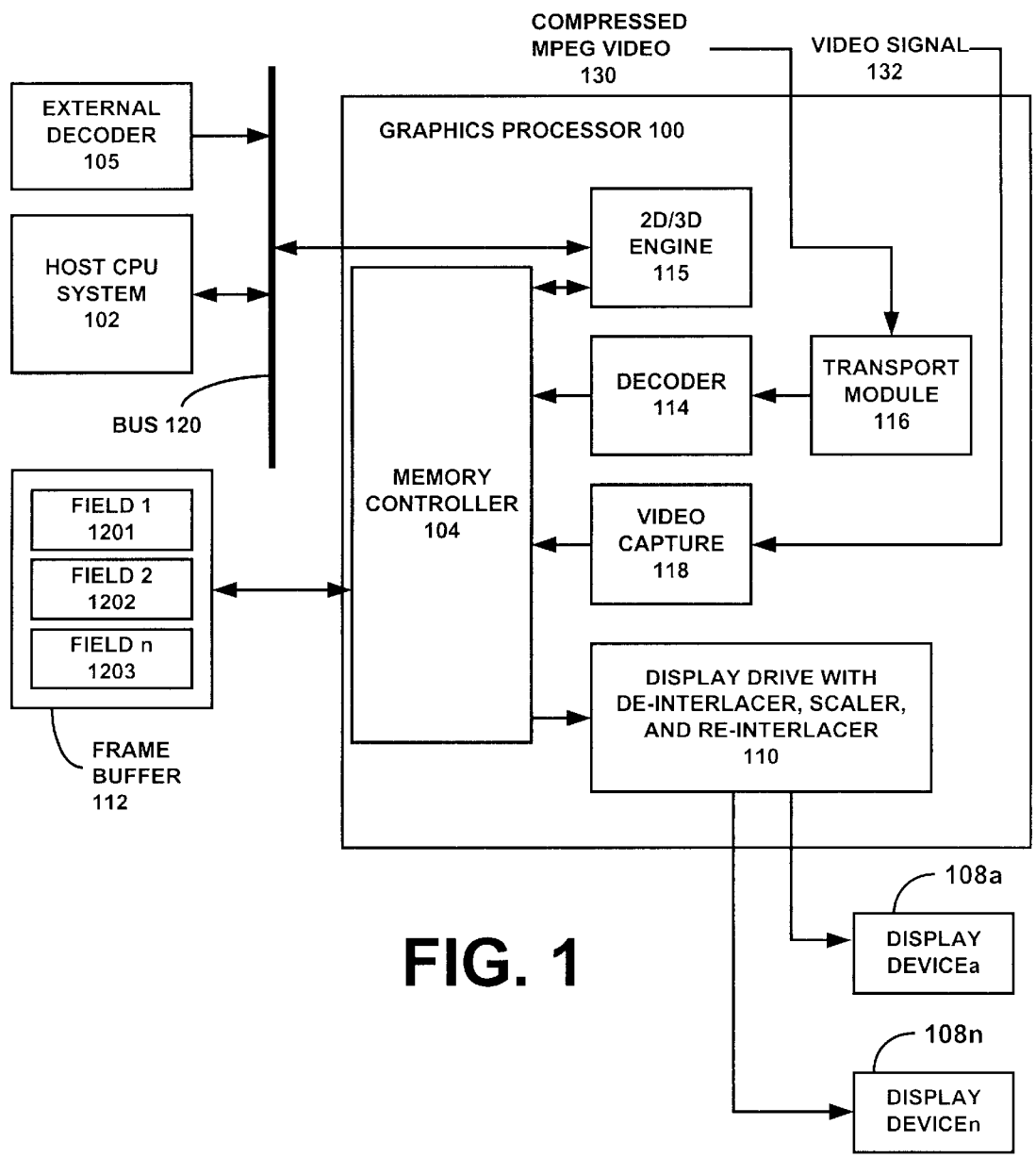
FIG. 1 is a block diagram illustrating a graphics processor in accordance with one embodiment of the invention.

FIG. 1 illustrates one example of a graphics processor 100 operatively coupled to a host CPU system 102, such as a host processor in an Internet appliance, laptop computer, or any other suitable device. The graphics processor 100 outputs display data to one or more display devices 108a–108n, which may be progressive display devices and/or interlaced display devices.

The graphics processor 100 includes a 2D/3D engine 115, a display drive 110, and if desired, a decoder 114 and transport module 116, such as an MPEG decoder, for receiving compressed MPEG video 130, and a video capture module 118 for receiving a video signal 132, as known in the art. A memory controller 104 interfaces the elements of the graphics processor 100 to a bus 120, which is also connected to the host CPU system 102 and an external decoder 105 that can also supply video signals to the graphics processor 100. The memory controller 104 is also connected to a frame buffer 112, which contains an image to be displayed, the image being stored as a plurality of fields 1201, 1202, 1203. One or more display devices 108a, 108n are connected to the display drive 110.

The present invention also provides on a single chip the ability to display a video image with a first resolution on an interlaced display having a second different resolution. This is also functionally equivalent to providing a first video image in a window on a second video image.

Two existing low cost de-interlacing techniques are commonly referred to as "bob" and "weave". By way of example, source format and final de-interlaced image could be 480 lines high, split into two 240 line even and odd fields for transmission, storage, or other processing common in the video industry. These fields are sampled $\frac{1}{60}^{th}$ of a second apart for NTSC style video.

Bob is a spatial deinterlacing algorithm where missing lines needed to reconstruct a frame from a field are spatially interpolated from the field. Weave is a temporal algorithm where missing lines needed to reconstruct a frame from a field are obtained from at least one field of opposite polarity. These lines are spatially correct, but temporally displaced.

Temporal deinterlacing, or weave, simply combines even and odd fields together to make one frame. Assuming 240 lines in each field, interleaving (or "weaving") the even field lines into the even numbered lines of the result frame, and interleaving the odd field lines in the odd numbered lines of the result frame, produces a de-interlaced frame of 480 lines.

Weave produces a perfect visual result for still images, and maintains full resolution for vertical source image detail. However, since even and odd fields were sampled sequentially with a time difference between them ($\frac{1}{60}^{th}$ second for NTSC video), weave produces motion artifacts on moving picture elements, or on camera zooms and pans, i.e. any relative motion between the camera and any source image element.

When fields containing motion are simply woven together, there is an unnatural "comb" or "weave" artifact on edges. These effects make weave unsuitable for quality TV viewing, although it is inexpensive to implement.

Spatial deinterlacing, or Bob, rather than combining even and odd fields together, displays each field independently. Assuming 240 lines in each field, bob displays each field by itself for its correct $\frac{1}{60}^{th}$ second interval, then displays the next field for its correct $\frac{1}{60}^{th}$ second interval. Because each even or odd field only contains 240 even or odd lines and a full resolution picture contains 480 lines, each field must be upscaled vertically by a factor of two during display. There is also a ½ line offset required to position the even and odd lines correctly. This produces a de-interlaced frame of 480 lines.

Figure 2:
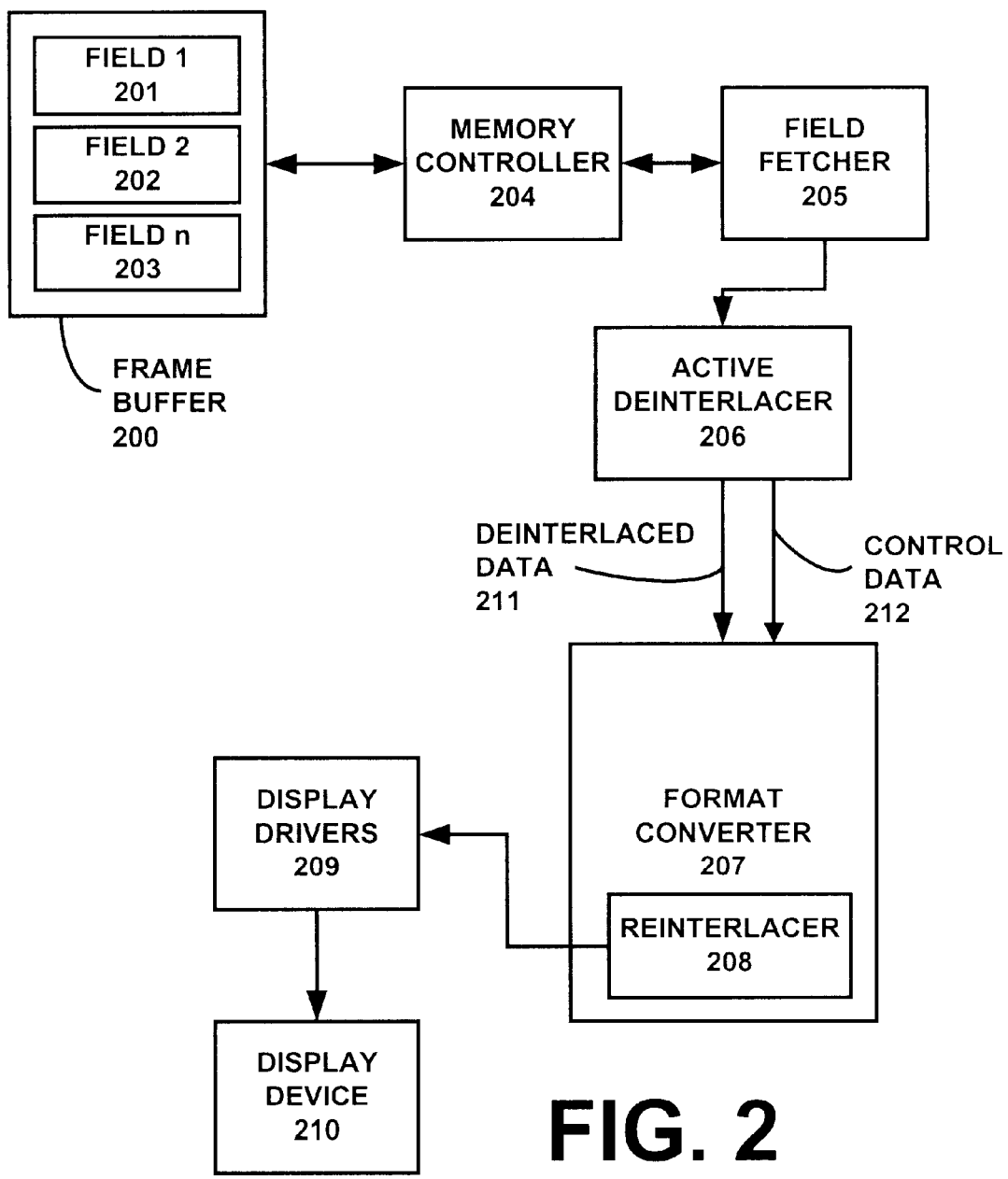
FIG. 2 is a general block diagram of the present invention.

FIG. 2 is a general block diagram depicting the present invention. A frame buffer 200 contains an image to be displayed, the image being stored as a plurality of fields 201, 202, 203. A field fetcher 205 fetches fields from the frame buffer 200 via a memory controller 204 as is known in the art. The field fetcher 205 arranges for field data from at least one field, such as field 201, to be passed from the frame buffer 200 to a deinterlacer 206 according to how the deinterlacer 206 needs to receive it. For example, if the deinterlacer 206 is working on a particular line on its output, the field fetcher 205 provides a few lines above and below that line from more than one field. The deinterlacer 206 takes these lines and applies a predetermined algorithm to produce a deinterlaced line. Numerous ways are known in the art for providing and operating the frame buffer 200, the memory controller 204, and the field fetcher 205, the field fetcher 205 being one of the clients of the memory controller 204.

As will be explained in more detail below, the deinterlacer 206 outputs image data 211 and control data 212 to a format converter 207. The format converter 207 provides data to a reinterlacer 208, which in turn supplies data to display drivers 209 that drive a display device 210.

In general terms the present invention is a de-interlacing/re-interlacing system for processing a series of video fields. The system has an active de-interlacer operatively coupled to receive first field data from a first field of the series of video fields and second field data from a second field of the series of video fields, the active de-interlacer being operative to produce de-interlaced data and control data therefrom. A format converter has at least a vertical scaler that is connected to directly receive the de-interlaced data and to produce vertically scaled data therefrom. The format converter also has a re-interlacer that is connected to directly receive the vertically scaled data and the control data. The re-interlacer is operative to produce a re-interlaced frame therefrom.

In one embodiment the present invention is a television system for displaying images on a television display that has a source of a series of video fields. As described above, the active de-interlacer receives first field data from a first field of the series of video fields and second field data from a second field of the series of video fields, and produces de-interlaced data and control data. The vertical scaler then directly receives the de-interlaced data and produces vertically scaled data. The re-interlacer receives the vertically scaled data and the control data, and produces a re-interlaced frame. A horizontal scaler is connected to receive the re-interlaced frame and to produce therefrom a horizontally scaled re-interlaced frame. A television encoder is then connected to receive the horizontally scaled re-interlaced fame and to produce therefrom television display signal for forming images on a television, a high definition television of other type of television display.

Figure 3:
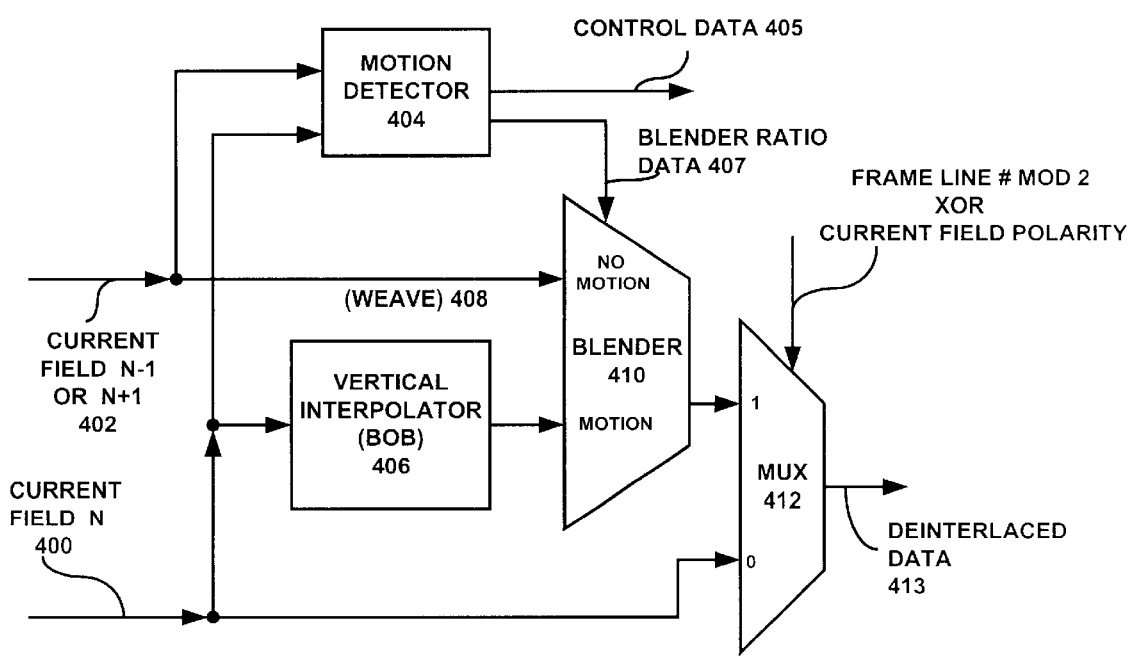
FIG. 3 is a block diagram of a de-interlacer according to the present invention.

A more detailed block diagram of one possible de-interlacer is depicted in FIG. 3. A motion detector 404 receives a current field N 400 and a current field N−1 or N+1 402 on separate inputs. A connection 408 connects the current field N−1 or N+1 402 to a "no motion" input of a blender 410. It is to be understood that the blender 410 of the present invention is not restricted to being a multiplexer. The vertical interpolator 406 connects the current field N 400 to a "motion" input of the blender 410. The motion detector 404 outputs blender ratio data 407 for controlling the blender 410. The motion detector 404 also outputs control data 405, which is indicative of motion in at least a portion of the image frame. For this particular embodiment, in combination with the motion detector 404, the connection 408 provides a weave function and the vertical interpolator 406 provides a bob function. As described above the weave function is used when no motion is detected, and the bob function is used when motion is detected. The control data 405 is sent from the motion detector 404 to a format converter as will be described below. In general the weave 408, the bob 406 and the blender 410 form just one embodiment of a deinterlacing algorithm. In very general terms, the motion detector 404 uses one or more of input terms, intermediate terms and output terms of the deinterlacing algorithm.

A multiplexer 412 is used to select between the spatially or temporally interpolated lines (input 1) and the lines of the frame that are in the current field (input 0). It is controlled by a signal that is a logical XOR of a frame line number modulo 2 and a current field polarity (even or odd), and has one input connected to an output of the multiplexer 412 and another input connected to receive the current field N 400. Deinterlaced data 413 appears on an output of the multiplexer 412.

Figure 4:
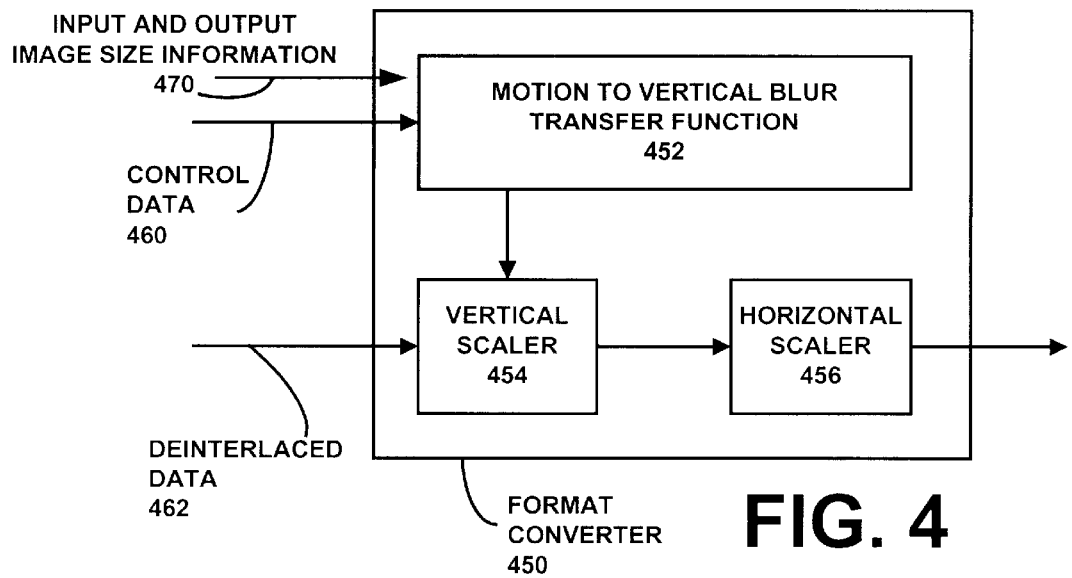
FIG. 4 is a block diagram of a format converter according to the present invention.

FIG. 4 depicts a generalized format converter 450 according to the present invention. Control data 460 and input and output image size information 470 are received by a motion to vertical blur transfer function block 452. Deinterlaced data 462 is received by a vertical scaler 454. The vertical scaler 454 outputs data to a horizontal scaler 456. The function block 452 determines how much vertical blur to apply as a function of the control data 460. It is to be understood that the vertical and horizontal scalers 454, 456 are combinable into a 2D filter, or their order can be reversed, or the horizontal scaler 456 could be eliminated altogether.

With the present invention, the format converter image has a vertical detail approaching the limit of the frame resolution. This detail will look sharp on an interlaced display. However, when the image on the interlaced display is in motion, some types of vertical detail will produce an artifact that will manifest itself as jagged edges where there should be smooth line. This artifact can be suppressed by blurring the vertical detail when there is motion.

Figure 5:
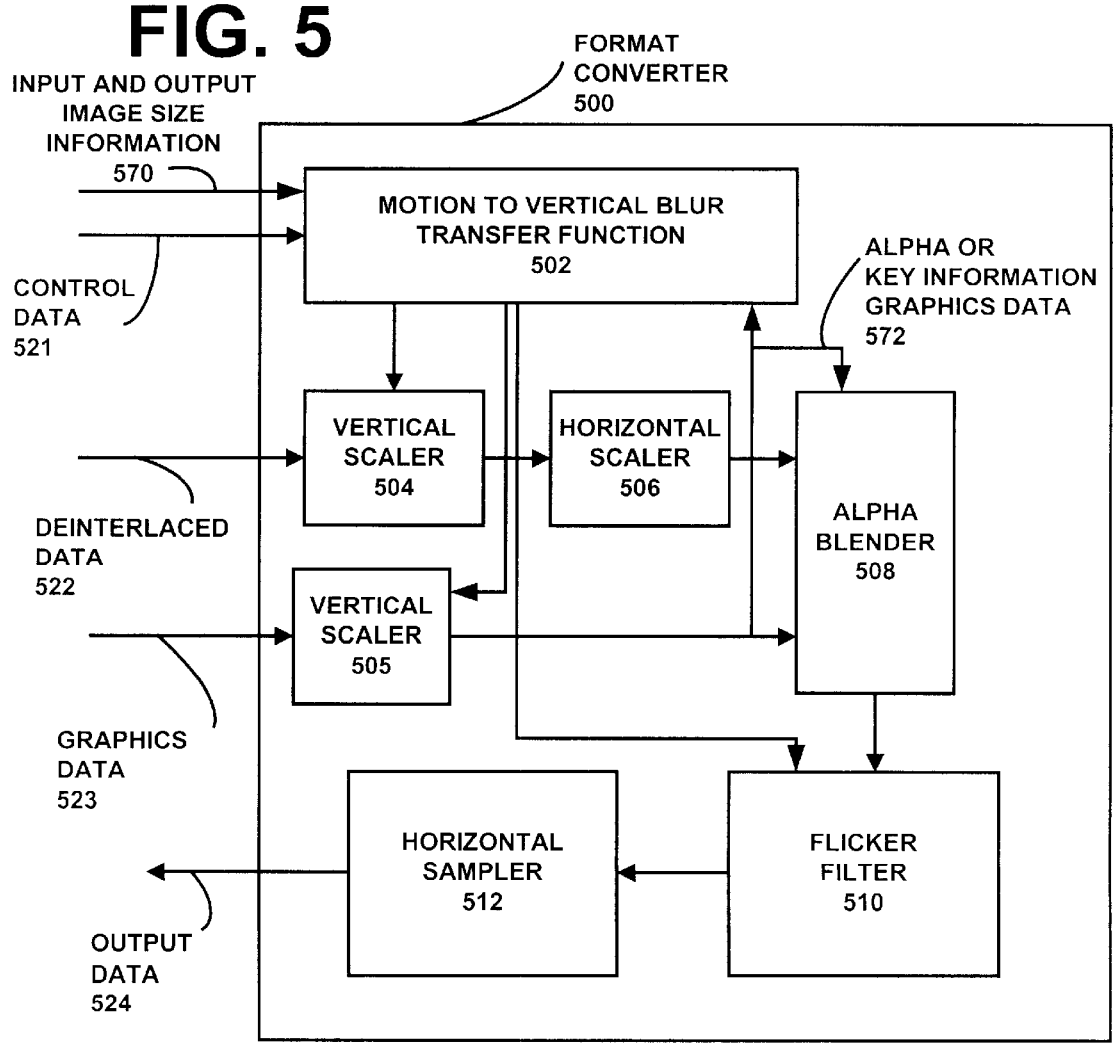
FIG. 5 is a block diagram of another embodiment of the format converter of the present invention.

FIG. 5 depicts another embodiment of a format converter 500 that has a motion to vertical bur transfer function block 502 that receives control data 521 and input and output image size information 570 (resolution). The input and output image size information is determined by the computer system during configuration as is known is the art. The deinterlaced data 522 is vertically and horizontally scaled by vertical and horizontal scalers 504, 506. As shown in FIG. 5 the scaled deinterlaced data is blended with graphic data 523 (after being horizontally scaled in the optional horizontal scaler 505) in an alpha blender 508. The output, which is video with on-screen display graphics, from the alpha blender 508 is applied to a flicker filter 510, which in turn is applied to a horizontal upsampler 512. The transfer function in this embodiment translates to "blur vertically if it is graphics" and "blur vertically if it is video with motion". The blur can be applied by the flicker filter 510 or by the vertical scaler 504 in the case of video. Depending upon the application, it is to be understood that the any one, two or all of the vertical scalers 504,505 and flicker filter 510 can be controlled by the motion to blur transfer function 502. Also in some embodiments the vertical scaler 505 can be omitted.

When utilizing the present invention, a resolution of the input image can be different from a resolution of the re-interlaced output. If the input is of higher vertical resolution than the output, it is very important to control the vertical frequencies using the motion to vertical blur transfer function 502 and one of the vertical scalars 504, 506 or flicker filter 510. Failure to do so will result in jagged artifacts when there is motion. If the output is of the same vertical resolution as the input, it may be desirable to reproduce the input at the output without adding any vertical blur or otherwise modifying the image. It can be assumed that the original input was professionally prepared by the broadcaster using high end equipment to look as good as possible on an interlace display. Finally, if the input is of a lower resolution than the output, then the image will already have relative little vertical detail at the output resolution.

Additional vertical blur would not be needed. Therefor the motion to vertical blur transfer function 502 will be affected by the difference between the vertical resolution of the input and output. It can also be controlled or tuned by a user.

Thus, the present invention overcomes the deficiency in the prior art by providing a method and apparatus for a de-interlacing/re-interlacing system as described above. The present invention is not limited to the particular details of the apparatus and method depicted and other modifications and applications are contemplated. Certain other changes may be made in the above-described method and apparatus without departing from the true spirit and scope of the invention herein involved. It is intended, therefore, that the subject matter of the depicting shall be interpreted as illustrative and not in a limiting sense.

What is claimed is:

1. A de-interlacing/re-interlacing system for processing a series of video fields of an input image frame, comprising:
    an active de-interlacer operatively coupled to receive at least first field data from a first field of the series of video fields and second field data from a second field of the series of video fields, the active de-interlacer operative to produce de-interlaced data and control data therefrom; and
    a format converter having a vertical scaler connected to directly receive the de-interlaced data and to produce vertically scaled data therefrom, and a re-interlacer connected to directly receive the vertically scaled data and the control data, the re-interlacer operative to produce a re-interlaced frame therefrom.

2. The de-interlacing/re-interlacing system according to claim 1, wherein the control data is indicative of detected motion in the image frame, wherein the format converter is operative to receive the control data including motion information regarding the image frame, and wherein, when motion is detected, the system produces de-interlaced data using a first procedure, and, when no motion is detected, produces de-interlaced image data using a second procedure.

3. The de-interlacing/re-interlacing system according to claim 2, wherein the first procedure is a substantially spatial deinterlacing procedure, and wherein the second procedure is a substantially temporal deinterlacing procedure.

4. The de-interlacing/re-interlacing system according to claim 2, wherein the second procedure preserves vertical details more than the first procedure.

5. The de-interlacing/re-interlacing system according to claim 4, wherein the first procedure reduces vertical detail.

6. The de-interlacing/re-interlacing system according to claim 2, wherein the first and second procedures are selectively utilized for different portions of the image frame.

7. The de-interlacing/re-interlacing system according to claim 1, wherein the format converter has a motion blur filter that is utilized as a function of the control data for motion compensation.

8. The de-interlacing/re-interlacing system according to claim 1, wherein, when an input resolution of the input image frame is of a higher vertical resolution than an output resolution of the re-interlaced frame, vertical frequencies are controlled using motion to vertical blur transfer function and at least one vertical scaler or flicker filter.

9. The de-interlacing/re-interlacing system according to claim 1, when the input image frame is of a lower input resolution than an output resolution of the re-interlaced image frame, the image will already have relative little vertical detail at the output resolution, and wherein the system thereby requires no additional vertical blurring.

10. The de-interlacing/re-interlacing system according to claim 1, wherein an input vertical resolution of the input image frame is substantially equal to an output vertical resolution of the re-interlaced image frame, the input image frame is reproduced as the re-interlaced image frame without adding any vertical blur or otherwise modifying the image of the input image frame.

11. The de-interlacing/re-interlacing system according to claim 1, wherein the system is integrated on a single chip.

12. A television system for displaying images on a television display, comprising:
    a source of a series of video fields of an input image frame;
    an active de-interlacer operatively coupled to receive at least first field data from a first field of the series of video fields and second field data from a second field of the series of video fields, the active de-interlacer operative to produce de-interlaced data and control data therefrom;
    a format converter having a vertical scaler connected to directly receive the de-interlaced data and to produce vertically scaled data therefrom, and a re-interlacer connected to directly receive the vertically scaled data and the control data, the re-interlacer operative to produce a re-interlaced frame therefrom, the control data being indicative of detected motion in the input image frame; and
    display drivers connected to receive the re-interlaced frame and to produce therefrom television display signal for forming images on a television.

13. The television system according to claim 12, wherein the format converter is operative to receive the control data including motion information regarding the image frame, and wherein, when motion is detected, the system produces de-interlaced data using a first procedure, and, when no motion is detected, produces de-interlaced image data using a second procedure.

14. The television system according to claim 13 wherein the first procedure is a substantially spatial deinterlacing procedure, and wherein the second procedure is a substantially temporal deinterlacing procedure.

15. The television system according to claim 13, wherein the second procedure preserves vertical details more than the first procedure.

16. The television system according to claim 15, wherein the first procedure reduces vertical detail.

17. The television system according to claim 13, wherein the first and second procedures are selectively utilized for different portions of the image frame.

18. The television system according to claim 12, wherein the format converter has a motion blur filter that is utilized as a function of the control data for motion compensation.

19. The television system according to claim 12, wherein, when an input resolution of the input image frame is of a higher vertical resolution than an output resolution of the re-interlaced frame, vertical frequencies are controlled using motion to vertical blur transfer function and at least one vertical scaler or flicker filter.

20. The television system according to claim 12, when the input image frame is of a lower input resolution than an output resolution of the re-interlaced image frame, the image will already have relative little vertical detail at the output resolution, and wherein the system thereby requires no additional vertical blurring.

21. The television system according to claim 12, wherein an input vertical resolution of the input image frame is substantially equal to an output vertical resolution of the re-interlaced image frame, the input image frame is reproduced as the re-interlaced image frame without adding any vertical blur or otherwise modifying the image of the input image frame.

22. The television system according to claim 12, wherein the system is integrated on a single chip.

* * * * *